Patented Dec. 18, 1951

2,578,654

UNITED STATES PATENT OFFICE 2,578,654

PREPARATION OF TERTIARY-ALKYL-SUBSTITUTED BENZENE CARBOXYLIC ACIDS

George W. Hearne, Lafayette, Theodore W. Evans, Oakland, and Vernon W. Buls, Walnut Creek, Calif., assignors to Shell Development Company, San Francisco, Calif., a corporation of Delaware No Drawing. Application January 28, 1950, Serial No. 141,166

7 Claims. (Cl. 260—524)

This invention relates to a process for the production of aromatic carboxylic acids and it more particularly relates to a process for the production of alkyl-substituted benzene carboxylic acids having directly substituted on the benzene ring a tertiary-alkyl group. In particular, the invention relates to a process for the production of tertiary-alkyl-substituted benzene carboxylic acids by the direct, selective, catalytic oxidation of monocyclic aromatic hydrocarbons having substituted on the benzene ring a tertiary-alkyl group and at least one non-tertiary, or primary or secondary alkyl group, such as the methyl group.

The alkyl-substituted benzene carboxylic acids, such as para-tertiary-butyl benzoic acid, having a tertiary-alkyl group directly substituted on the benzene ring show outstanding promise as technically useful chemicals. They have been found to be particularly useful in the compounding of rubbers and as intermediates from which, when used in the form of their esters with unsaturated alcohols, improved resins can be prepared. The tertiary-alkyl-substituted benzoic acids in which the tertiary-alkyl group contains nine or more carbon atoms, especially from nine to twenty-one carbon atoms, are also of considerable promise as improved detergent- or soap-forming acids.

A method for the production of these useful tertiary-alkyl-substituted benzene carboxylic acids forms a principal object of the present invention. Another and more particular object of the invention is a method for the production of tertiary-alkyl-substituted benzene carboxylic acids by selective catalytic oxidation of alkyl-substituted benzenes having at least one tertiary-alkyl radical and at least one non-tertiary-alkyl radical directly substituted on the benzene ring. A method for accomplishing the selective oxidation to provide high yields of the desired tertiary-alkyl-substituted aromatic carboxylic acid is another important object of the invention. A specific object of the invention is a method for oxidizing tertiary-butyl toluene to produce selectively tertiary-butyl benzoic acid. Other and related objects of the invention will become apparent from the nature of the disclosures and claims hereinafter.

It has been reported that cymene (para-isopropyl toluene) can be oxidized by treatment with molecular oxygen in the presence of certain oxidation catalysts to produce, among other products, cumic acid. According to the known method, the oxidation of para-cymene preferably is conducted at temperatures below 50° C., although even at temperatures above 30° C. the formation of oxidation products other than cumic acid becomes marked. At a temperature of 69° C., in the presence of a lead-manganese acetate catalyst, only small amounts of cumic acid are formed by such oxidation of para-cymene, while if the reaction temperature is further raised to about 140° C., practically no cumic acid is formed. The catalytic oxidation of para-cymene at temperatures higher than 140° C. also has been reported. At such higher temperatures, the isopropyl group was attacked while the methyl group remained unaffected, with the result that the oxidation produced para-toluic acid and para-tolyl methyl ketone.

It also has been proposed heretofore to oxidize catalytically certain mono- and poly-alkyl-substituted benzenes with the object of producing alkyl aryl ketones, or corresponding mono- or poly-basic aromatic carboxylic acids, respectively. In the former case, an alkyl group containing two or more carbon atoms is oxidized with formation of a keto group or an oxy group at the carbon atom adjacent to the benzene ring, while in the latter case all of the alkyl substituents on the benzene ring are destructively oxidized to carboxyl groups.

We have discovered that alkyl-substituted benzenes having a tertiary-alkyl group and at least one non-tertiary-alkyl group directly substituted on the benzene ring can be selectively oxidized by treatment with molecular oxygen in the presence of suitable oxidation catalysts to produce in high yields aromatic carboxylic acids having a tertiary-alkyl group directly substituted on the benzene ring, the reaction involving selective oxidation to carboxyl groups of the non-tertiary-alkyl group or groups substituted on the benzene ring while the tertiary-alkyl group remains unaffected.

It has been further discovered in accordance with the present invention that, with respect to such selective oxidation, alkyl-substituted benzenes of the aforesaid class, having both a tertiary-alkyl group and at least one non-tertiary-alkyl group directly substituted on the benzene ring, differ markedly and unexpectedly from apparently closely related alkyl-substituted benzenes, such as para-cymene, having a secondary-alkyl group (instead of a tertiary-alkyl group) and a primary-alkyl group substituted on the benzene ring.

It has been found that poly-alkyl benzenes having a tertiary-alkyl substituent group and at least one primary or secondary alkyl substituent group on the benzene ring, when treated at temperatures reported to be especially suited for the oxidation of para-cymene to cumic acid with molecular oxygen in the presence of oxidation catalysts, such as a mixture of lead and manganese acetates, are resistant to oxidation, i. e., form no aromatic carboxylic acids in any reasonable time. For example, treatment of para-tertiary-butyl toluene at 69° C. with gaseous oxygen in the presence of lead-manganese acetate catalyst for as long as twenty-four hours, formed no measurable quantity of para-tertiary-butyl benzoic acid. Similar results have been obtained by us with para-tertiary-amyl toluene at a temperature of 69° C. in the presence of manganese naphthenate catalyst, and with para-tertiary-dodecyl toluene at a temperature of 80° C. using cobalt isovalerylacetonate as catalyst. At temperatures below 50° C., the tertiary-alkyl-substituted polyalkyl benzenes of the above-defined class are essentially inert with respect to the catalytic oxidation treatment.

On the other hand, it has been discovered in accordance with the invention that tertiary-alkyl-substituted benzenes having both a tertiary-alkyl group and at least one non-tertiary-alkyl group directly substituted on the benzene ring, can be selectively oxidized to the corresponding tertiary-akyl-substituted benzene carboxylic acids at temperatures preferably above 140° C., and even as high as 180° C. or higher, the yields of the desired tertiary-alkyl-substituted aromatic carboxylic acid being under optimum conditions as high as 90% of the hydrocarbon consumed. Since both the conversion of para-cymene to cumic acid and the conversion of, for example, para-tertiary-butyl toluene to para-tertiary-butyl benzoic acid involve oxidation of the non-tertiary-alkyl group, or methyl group, the branched-chain alkyl group being unaffected in both reactions, it would be reasonable to expect that both reactions would occur to substantially the same extent under equivalent conditions. It was indeed surprising to discover the critical, marked difference between these respective types of hydrocarbons.

In essence, it has been discovered in accordance with the invention that, poly-alkyl-substituted benzenes having both a tertiary-alkyl group and a non-tertiary-alkyl group substituted on the benzene ring, when treated with gaseous oxygen in the presence of oxidation catalysts, are converted to tertiary-alkyl-substituted benzene carboxylic acids in increasing yields and conversions as the temperature is increased within a defined range of temperatures whereas, in marked contrast thereto, poly-alkyl-substituted benzenes having a secondary-alkyl group (instead of a tertiary-alkyl group) and a non-tertiary-alkyl group substituted on the benzene ring, when similarly treated are converted to secondary-alkyl-substituted benzene carboxylic acids in yields and conversions that rapidly decrease as the temperature is increased within the same defined range of temperatures. Tertiary-alkyl-substituted benzene carboxylic acids have been produced according to the invention in high yields and conversions by catalytic oxidation of suitable tertiary-alkyl-substituted benzene hydrocarbons under conditions at which no corresponding secondary-alkyl-substituted benzene carboxylic acid has been produced by catalytic oxidation of a secondary- (rather than tertiary-) alkyl-substituted benzene hydrocarbon.

On the basis of the present discovery, the invention provides an efficient process for the direct conversion of alkyl-substituted benzenes having both a tertiary-alkyl group and at least one non-tertiary-alkyl group directly substituted on the benzene ring to corresponding tertiary-alkyl-substituted benzene carboxylic acids. The aromatic hydrocarbons which are selectively oxidized according to the process of the invention are the alkyl-substituted benzenes having at least one tertiary-alkyl radical and at least one non-tertiary-alkyl radical directly attached to the benzene ring. As employed throughout the specification and appended claims, the terms "primary-alkyl radical," "secondary-alkyl radical," and "tertiary-alkyl radical" designate the monovalent hydrocarbon radicals having the formulas —$CH_2R$, —$CHR'_2$, and —$CR'_3$, respectively, in which R is the hydrogen atom or an alkyl radical and R' is an alkyl radical, in each case the hydrocarbon radical being attached to the benzene ring by the free valency in the formula. The term "non-tertiary-alkyl radical" refers exclusively to the primary-alkyl and the secondary-alkyl radicals. The tertiary-alkyl radical may contain from four to as many as twenty-one carbon atoms, the preferred aromatic hydrocarbons having not more than one tertiary-alkyl radical substituted on the benzene ring. The non-tertiary-alkyl radical or radicals substituted on the benzene ring preferably contain from one to four carbon atoms, the preferred hydrocarbons being di-substituted on the benzene ring, one of the two substituents preferably being the methyl group. Illustrative examples of individual aromatic hydrocarbons which can be selectively oxidized according to the process of the invention include, among others, para-tertiary-butyl toluene, ortho-tertiary-butyl toluene, meta-tertiary-butyl toluene, para-tertiary-amyl toluene, ortho-tertiary-amyl toluene, meta-tertiary-amyl toluene, para-tertiary-hexyl toluene, meta-tertiary-hexyl toluene, ortho-tertiary-hexyl toluene, para-tertiary-heptyl toluene, ortho-tertiary-heptyl toluene, meta-tertiary-heptyl toluene, para-tertiary-nonyl toluene, ortho-tertiary-nonyl toluene, meta-tertiary-nonyl toluene, para-tertiary-dodecyl toluene, ortho-tertiary-dodecyl toluene, meta-tertiary-dodecyl toluene, para-tertiary-tetradecyl toluene, ortho-tertiary-tetradecyl toluene, meta-tertiary-tetradecyl toluene, para-tertiary-pentadecyl toluene, ortho-tertiary-pentadecyl toluene, meta-tertiary-pentadecyl toluene, para-tertiary-hexadecyl toluene, ortho-tertiary-hexadecyl toluene, meta-tertiary-hexadecyl toluene, para-tertiary-octadecyl toluene, ortho-tertiary-octadecyl toluene, meta-tertiary-octadecyl toluene, para-tertiary-eicosyl toluene, ortho-tertiary-eicosyl toluene, meta-tertiary-eicosyl toluene, para-tertiary-heneicosyl toluene, ortho-tertiary-heneicosyl toluene and meta-tertiary-heneicosyl toluene. While the tertiary-alkyl-substituted toluenes form a preferred group of suitable aromatic hydrocarbons, there can also be employed aromatic hydrocarbons having substituted on the benzene ring a tertiary-alkyl group and, in addition thereto, a plurality of methyl groups and/or one or more lower alkyl groups other than the methyl group. Such aromatic hydrocarbons are illustrated by the tertiary-butyl xylenes, the tertiary-heptyl xylenes, the tertiary-dodecyl xylenes, ortho-tertiary-hexyl ethyl benzene, meta-tertiary-hexyl ethyl benzene, para-tertiary-hexyl ethyl benzene, para-tertiary-amyl propyl benzene, para-tertiarynonyl n-butyl benzene, 2-propyl-4-tertiary-butyl ethyl benzene, and the like. The mono-tertiary-alkyl toluenes and the mono-tertiary-alkyl xylenes form a preferred group of aromatic hydrocarbons within this more general class of hydrocarbons.

The process of the invention is carried out by intimately contacting in a continuous manner molecular or gaseous oxygen with the tertiary-alkyl-substituted aromatic hydrocarbon in liquid phase in the presence of an oxidation catalyst. Suitable oxidation catalysts comprise, in general, compounds of heavy metals, which compounds are soluble in para-tertiary-butyl toluene to an extent of 0.001% by weight or more. The compound of the heavy metal preferably contains oxygen and either may be inorganic or may comprise an organic portion. The preferred catalysts comprise the oxygen-linked organic compounds of the heavy metals, i. e., compounds wherein an atom of a heavy metal is directly linked to oxygen, especially of the heavy metals from Groups IB, IIB, IVA, VB, VIB, VIIB, and the cobalt family of Group VIII of the periodic table as given in "Fundamental Chemistry," second edition, by H. G. Deming, published by John Wiley and Sons, Incorporated. Heavy metals, suitable compounds of which may be employed as the catalyst, include, for example, manganese, bismuth, cobalt, lead, copper, vanadium, tin, chromium, mercury, molybdenum, silver, etc. Compounds of lead, of cobalt and of manganese are particularly effective and are preferred catalysts. Illustrative examples of particular compounds of heavy metals which may be employed as the catalyst include, for example, cobalt isovalerylacetonate, manganese naphthenate, cobalt acetate, cobalt butyrylacetonate, manganese para-tertiary-butyl benzoate, manganese acetate, cobalt butyrate, chromium naphthenate, manganese acetylacetonate, vanadium pentoxide, copper oxide, manganese dioxide, and cobalt naphthenate. The preferred catalysts are compounds of heavy metals having atomic weights from 50 to 190. The organic oxygen-linked compounds of the heavy metals, such as the salts of heavy metal with aliphatic carboxylic acids, e. g., the acetates, the butyrates, etc., and the chelate organic compounds or salts of heavy metals, e. g., the chelate complexes of heavy metals with dicarbonyl compounds, are especially suitable. The amount of the catalyst present in the reaction mixture may be varied over wide limits. Only minor amounts of the catalyst are required. As little as 0.005% by weight of the catalyst, based upon the weight of the hydrocarbon undergoing oxidation may be employed and as much as 5% by weight of the catalyst may be used. The amount of the catalyst preferably is between about 0.01% and about 2% by weight of the hydrocarbon furnished to the process.

As the molecular oxygen-containing gas, there may be employed air, oxygen-enriched air, or substantially pure gaseous oxygen, such as the commercially available "gaseous oxygen" having an oxygen content of about 85% or higher. When, in accordance with a preferred aspect of the invention to be referred to hereinafter, the oxidation is conducted under high pressures, oxygen-containing gas mixtures having an oxygen content below that of the atmosphere are advantageously employed, such mixtures preferably having oxygen contents within the range of from about 5% by volume to about 20% by volume. As such mixtures there may be employed air that has been diluted with a suitable inert gas, such as nitrogen, steam, carbon dioxide, or the like, or corresponding mixtures prepared from substantially pure gaseous oxygen and such inert diluents may be used. When the hydrocarbon that is employed is a solid at the desired reaction temperature or when other considerations make it desirable, the process may be carried out in the presence of inert solvents or diluents in the reaction mixture, such as a lower fatty acid, an ether, or the like. Reaction initiators may be employed if desired, such as added peroxidic compounds, e. g., benzoyl peroxide, di-t-butyl peroxide, acetyl peroxide, barium peroxide, and the like. Excellent results have been obtained when operating in the absence of added initiators other than the catalyst comprising a compound of a heavy metal.

It has been found, in accordance with the invention, to be essential to employ a temperature that is above a certain minimum suitable temperature, below which the desired reaction has not been found to occur, but that is below the temperature at which excessive non-selective oxidation of the hydrocarbon reactant would occur. The minimum temperature which thus is employed in accordance with the process of the invention is not below 100° C., and in most cases temperatures of 120° C. or above are necessary to effect the desired reaction to any practical extent. As the reaction temperature is increased from about 100° C., the rate of reaction as well as the yield of the desired product increases. The optimum yields of and conversions to the desired tertiary-alkyl-substituted benzene carboxylic acids have been obtained at temperatures higher than 130° C. Accordingly, when carrying out the process in a preferred manner, a reaction temperature of not less than about 130° C. is employed. The maximum temperature that is used most advantageously will depend to a certain extent upon the particular tertiary-alkyl-substituted aromatic hydrocarbon that is employed and in part upon the oxidation catalyst and associated reaction conditions. It will be evident that at excessively high temperatures non-selective oxidation of the hydrocarbon will tend to occur, resulting ultimately in its substantially complete conversion to carbon dioxide and water. The process of the present invention is carried out at temperatures below a temperature at which substantial non-selective oxidation of the hydrocarbon occurs. While temperatures as high as 300° C. may be used, in most cases temperatures not over 225° C. will be employed, and in the preferred case a maximum temperature of about 200° C. is particularly desirable.

The process of the invention may be conducted under atmospheric or even subatmospheric pressures, as well as under superatmospheric pressures. In accordance with a preferred, more limited embodiment of the invention, the oxidation of the tertiary-alkyl-substituted aromatic hydrocarbon is carried out at temperatures in excess of 140° C., preferably from 140° C. to 200° C., and under a total pressure within the range of from about 100 pounds per square inch up to about 1000 pounds per square inch. When the process is to be conducted under such superatmospheric pressures, the gaseous mixture comprising molecular oxygen preferably has a content of molecular oxygen below that present in the air, the mixtures containing from about 5% to about 20% oxygen referred to hereinbefore being suitable and mixtures containing from about 5% to about 15% oxygen being preferred.

It has been discovered in accordance with the invention that by employing elevated temperatures of 140° C. or above, and operating preferably under superatmospheric pressure with the aid of dilute oxygen-containing gas mixtures, conversions of the tertiary-alkyl-substituted aromatic hydrocarbon to tertiary-alkyl-substituted benzene carboxylic acid as high as 50% or more may be attained while, at the same time, the selectivity of the oxidation is such that yields of the tertiary-alkyl-substituted benzene carboxylic acid as high as 80% to 90%, based upon the hydrocarbon consumed, result. Under the optimum conditions only negligible quantities of by-products, such as aldehydes, ketones, alcohols, or carboxylic acids other than the desired tertiary-alkyl-substituted benzene carboxylic acid, are produced.

The process of the invention may be carried out either batchwise, intermittently, or continuously. When the process is carried out continuously, as is preferred, the reaction vessel comprises a suitable container, provided with means for controlling the temperature and the pressure, to which the tertiary-alkyl-substituted hydrocarbon to be oxidized is charged. A stream of a gaseous mixture comprising molecular oxygen is passed into and through the reaction zone in intimate contact with the mixture of hydrocarbon, added catalyst, and the solvent if one is employed. It is desirable to agitate vigorously the liquid mixture during the oxidation, as by the action of the gaseous stream passed therethrough or by a power-driven stirrer. Hydrocarbon feed may be continuously charged to the reactor while a portion of the reaction mixture is continuously withdrawn for recovery of the desired product therefrom, with recycle, if desired, of any unconsumed hydrocarbon. Instead of employing a container or vessel in which an amount of the liquid hydrocarbon is maintained during the oxidation treatment, streams of the hydrocarbon and of the gaseous mixture comprising molecular oxygen may be passed either countercurrently or concurrently through a chamber packed with a suitable packing material and adapted to afford intimate contact of a large surface of the hydrocarbon feed with the gaseous stream, such as a column packed with glass helices, with alumina pellets, with porcelain beads, or the like. The oxidation preferably is carried to a point at which not over about 70% of the hydrocarbon in the reaction mixture has been consumed, since it has been found that by limiting in this manner the total conversion of the hydrocarbon feed in any one cycle or batch, optimal yields of the desired carboxylic acid may be obtained. The desired product can be recovered from the reaction mixture by any suitable method. In many cases it suffices merely to cool the reaction mixture whereupon the desired tertiary-alkyl-substituted benzene carboxylic acid separates in crystalline form from the mixture. The selectivity of the process carried out according to the present invention is such that the negligible or slow accumulation of by-products makes possible in many cases direct recycling of the mother liquors from such a crystallization step without additional treatment to purify the unconsumed hydrocarbon therein. If desired, the tertiary-alkyl-substituted benzene carboxylic acid may be recovered from the reaction mixture by extraction with an aqueous solution of an alkali and acidification of the resulting aqueous extract to regenerate the acid from its salt, by direct extraction of the acid with selective solvents, by precipitation of insoluble derivatives, by fractional distillation, or like methods.

The following examples will serve to illustrate in detail the process of the invention as applied to particular tertiary-alkyl-substituted aromatic hydrocarbons and certain of the advantageous features of the invention. It will be appreciated that the examples are presented with the intent to illustrate the invention rather than to limit the same as it is defined in the hereto-appended claims.

*Example I.—Oxidation of para-tertiary-amyl toluene to para-tertiary-amyl benzoic acid— effect of temperature*

In order to demonstrate the effect of temperature upon the oxidation of para-tertiary-amyl toluene to para-tertiary-amyl benzoic acid, portions of para-tertiary-amyl toluene were oxidized separately in the presence of manganese naphthenate as catalyst by aeration with molecular oxygen. The reaction equipment comprised a glass tube 3.4 centimeters in diameter and 45 centimeters in length, surrounded by a heated liquid by means of which the reaction temperature was maintained at the desired value. Gaseous oxygen was introduced into the tube through a sintered glass disk sealed across the lower end and thence directly into the liquid hydrocarbon contained in the tube. The gaseous mixture leaving the upper end of the tube was passed through a water-cooled condenser by means of which volatilized materials were condensed, and finally through a cold trap in which any products that were gaseous at tap water temperatures were collected. The material collected from the water-cooled condenser was allowed to stratify, the aqueous phase was separated, and the organic phase was continuously returned to the reaction vessel. Three runs were carried out, using the temperatures listed in the following table. In each run the sample of the para-tertiary-amyl toluene was aerated for the indicated time in the presence of an amount of added manganese naphthenate equal to 1% by weight of the hydrocarbon. The results shown in the following table were observed:

TABLE I

| Run No. | Temperature, ° C. | Time, Hours | Conversion of Para-Tertiary-Amyl Toluene to Para-Tertiary-Amyl Benzoic Acid |
|---|---|---|---|
| | | | Per Cent |
| 1 | 69 | 22½ | 0.5 |
| 2 | 100 | 23½ | 2.1 |
| 3 | 140 | 6 | 35.4 |

It will be noted that in the above experiments the run conducted at 140° C. entailed a reaction time of six hours while the two runs at the lower temperatures involved reaction times of 22½ and 23½ hours. Despite the shorter reaction time at the higher reaction temperature, the conversion of the hydrocarbon to the tertiary-alkyl-substituted benzoic acid was increased approximately seventeen-fold by operating at 140° C. instead of 100° C. Only negligible amounts of acid were formed at 69° C.

*Example II.—The effect of temperature upon the oxidation of para-tertiary-butyl toluene to para-tertiary-butyl benzoic acid*

In this group of experiments the effect of temperature upon the oxidation of para-tertiary-butyl toluene to para-tertiary-butyl benzoic acid was determined. The experiments were carried out in the manner described in the preceding example employing an all glass reactor, atmospheric pressures, and molecular oxygen. In each experiment approximately 100 grams of the para-tertiary-butyl toluene and approximately 0.5 gram of catalyst were used. The catalyst used in this series of experiments was a lead-manganese acetate catalyst prepared by fusing together lead acetate and manganese acetate, cooling the fused mixture, and finely grinding. The catalyst contained approximately two-thirds (weight basis) manganese acetate and about one-third lead acetate. In all of the experiments the reaction time was 23 to 23½ hours. The results shown in the following table were observed.

TABLE II

| Run No. | Temperature, °C. | Conversion of Hydrocarbon Applied to Acid |
|---|---|---|
| 1 | 69 | no reaction observed. |
| 2 | 100 | Do. |
| 3 | 120 | 0.7%. |
| 4 | 140 | 16%. |

From the results given in the above table it will be seen that a minimum temperature not less than 100° C. is indicated. In this series of experiments the highest conversion was obtained at 140° C. Judging by results of other experiments carried out by us, even higher conversions of the para-tertiary-butyl toluene to para-tertiary-butyl benzoic acid would have been obtained by operating at temperatures above 140° C.

*Example III.—The preparation of para-tertiary-dodecyl benzoic acid by oxidation of para-tertiary-dodecyl toluene—the effect of temperature*

Preparation of para-tertiary-dodecyl toluene. Para-tertiary-dodecyl toluene was prepared by the alkylation of toluene with propylene tetramer (a tertiary-base dodecylene produced by polymerization of propylene) in the presence of 90% sulfuric acid. The olefin was added slowly to a fourfold excess of toluene mixed with 90% sulfuric acid and the mixture allowed to stand at 15° C. for one hour. The mixture was then poured onto crushed ice, the layers which formed were separated, and the organic product was distilled to recover the para-tertiary-dodecyl toluene.

Oxidation of para-tertiary-dodecyl toluene. In order to show the effect of temperature upon the oxidation of para-tertiary-dodecyl toluene to para-tertiary-dodecyl benzoic acid, four portions of the para-tertiary-dodecyl toluene prepared above were oxidized separately in the presence of 1% by weight of cobalt isovalerylacetonate as catalyst in the manner described in the preceding examples. Each portion was oxidized at the respective temperature shown in Table III for twenty-four hours and the amount of para-tertiary-dodecyl benzoic acid formed was then determined. The results shown in Table III were observed:

TABLE III

| Run No. | Temperature, °C. | Conversion of Hydrocarbon to Acid |
|---|---|---|
| | | Per cent |
| 1 | 80 | 3.7 |
| 2 | 100 | 37.6 |
| 3 | 120 | 31.9 |
| 4 | 140 | 32.3 |

From the results given in the table, it will be seen that at a temperature of 80° C., which is below the lowest suitable temperature, the conversion of hydrocarbon applied to acid was only a negligible 3.7%. On the other hand, at temperatures above 100° C. the conversion of hydrocarbon applied to acid was above 30%, the highest observed conversion in this group of experiments being 37.6%.

*Example IV.—Oxidation of para-tertiary-butyl toluene to produce para-tertiary-butyl-benzoic acid*

The run described in this example was carried out with the object of determining the selectivity of the oxidation and to illustrate a cyclic method of operation in which unconsumed hydrocarbon is recycled to the oxidation step of the process. The reactor was a five-liter Pyrex flask surrounded by a thermostatically controlled temperature-regulating bath, and provided with a power-driven stirrer and inlet tube disposed to introduce gaseous oxygen near the bottom of the vessel and an outlet for gaseous effluent, connected to a water-cooled condenser having a phase-separating head arranged for removal of aqueous condensate and for return to the reactor of the organic portion of the condensate. The outlet end of the water-cooled condenser was connected to a cold-trap immersed in Dry Ice-acetone mixture, wherein volatile materials passing through the water-cooled condenser were collected. The vessel was also equipped with suitable means for introducing and withdrawing liquid charge and product, respectively, and with a thermometer. There were charged to the reactor 2978 grams of para-tertiary-butyl toluene and 7.445 grams of cobalt acetylacetonate as catalyst. Gaseous oxygen was circulated through the reaction mixture at a rate of 0.035 mole per minute at an average temperature of 135° C. for about eighteen hours. At the end of this time the crude product in the reactor was withdrawn to a second vessel and cooled gradually with stirring, to crystallize para-tertiary-butyl benzoic acid. When cool, the resulting slurry of crystalline para-tertiary-butyl benzoic acid in para-tertiary-butyl toluene was filtered and the crystals of para-tertiary-butyl benzoic acid were washed with fresh para-tertiary-butyl toluene until the combined filtrate and washings equalled the volume of the original charge to the reactor. The combined filtrate and washings were then returned to the reactor and further treated with gaseous oxygen under the same conditions used in the original cycle. The above procedure was carried out for a total of six cycles. The total amount of para-tertiary-butyl toluene charged was 12,021 grams. The para-tertiary-butyl benzoic acid recovered from the several cycles was combined, thoroughly washed with petroleum ether to remove any adhering para-tertiary-butyl toluene, and then dried. The para-tertiary-butyl benzoic acid thus prepared was colorless, substantially odorless, and had a melting point of 164.5° C. Following the final cycle, the collected water that had been produced in the reaction, the condensed volatile products, the petroleum ether washings, and the filtrate from the last crystallization of para-tertiary-butyl benzoic acid were distilled and analyzed. The following results were obtained.

TABLE IV

| Material Accounted For | Per Cent Conversion Based Upon Tertiary-Butyl Toluene Charged | Per Cent Yield Based Upon Tertiary-Butyl Toluene Consumed |
|---|---|---|
| Unreacted para-tertiary-butyl toluene recovered | 24.7 | |
| Para-tertiary-butyl benzoic acid recovered | 66.8 | 88.74 |
| Total Acids | 67.9 | 90.2 |
| $C_1$–$C_4$ products | 0.9 | 1.2 |
| Tertiary-butyl benzaldehyde | 0.2 | 0.3 |
| Unidentified and polymer | 1.4 | 1.8 |
| Unaccounted for | 4.9 | 6.5 |

It is to be noted from the above table that of the total acids formed, the para-tertiary-butyl benzoic acid amounted to 98.2%, indicating, on the basis of total acids formed, substantially quantitative conversion of the tertiary-butyl toluene to tertiary-butyl benzoic acid. Most of the remaining acid was meta-tertiary-butyl benzoic acid formed by oxidation of small amounts of the meta isomer present in the para-tertiary-butyl toluene. The presence of only minute quantities of $C_1$–$C_4$ products in conjunction with the high yield of tertiary-butyl benzoic acid demonstrates that the selective oxidation of the methyl substituent group was achieved with negligible oxidation of the tertiary-butyl substituent group.

*Example V*

The experiment described in this example was carried out under superatmospheric pressure, at a temperature even higher than that employed in the preceding example and in the presence of cobalt naphthenate present in an amount corresponding to 0.04% by weight of cobalt, based on the hydrocarbon charged. An electrically heated one-gallon stainless steel autoclave was employed as the reactor. The autoclave was provided with suitable inlets and outlets, a power-driven propeller-type stirrer and with the usual thermometer and pressure gauge. Tertiary-butyl toluene and the cobalt naphthenate catalyst were charged to the autoclave and treated at 165° C. and a pressure of 250 pounds per square inch (gauge) with a stream of air that had been diluted with nitrogen to an oxygen content of 10%. The flow rate of the oxygen-containing gas stream was 0.25 mole of oxygen per mole of tertiary-butyl toluene per hour. During the first four hours of the run, the conversion of the oxygen exceeded 90% and was about 70% at the end of five hours' time, at which time the run was terminated. A total of about 1.1 moles of oxygen was consumed per mole of tertiary-butyl toluene charged. Approximately 50% of the tertiary-butyl toluene charged was consumed. The autoclave was opened, the contents withdrawn and cooled to about 10° C., approximately 80% of the acid produced crystallizing from the mixture. The yield of tertiary-butyl benzoic acid was found to be about 86%, based upon the amount of tertiary-butyl toluene consumed.

*Example VI*

The experiment described in Example V was repeated employing a reaction temperature of 165° C., a pressure of 400 pounds per square inch, and a flow rate of the oxygen-containing gas mixture of about 0.375 mole of oxygen per mole of tertiary-butyl toluene per hour. The oxidation was continued until approximately 62% of the tertiary-butyl toluene charged had been consumed. Tertiary-butyl benzoic acid was found to have been formed in a yield of about 90%, based upon the amount of tertiary-butyl toluene consumed. Despite the elevated temperature and high oxygen pressure, the loss of tertiary-butyl toluene through oxidation to carbon dioxide and/or carbon monoxide was less than 4%.

The following examples will further illustrate further specific embodiments of the present invention.

*Example VII*

In a five liter reaction vessel equipped with a stirrer and immersed in a heated oil bath, one gallon of para-tertiary-dodecyl toluene (prepared by alkylation of toluene with propylene tetramer) was aerated in the presence of 0.25% by weight of added cobalt isovalerylacetonate at a maximum temperature of 114° C. for twenty-four hours. The aeration was effected by introducing a stream of gaseous oxygen through an inlet covered by a sintered glass plate and immersed in the liquid hydrocarbon. Low boiling reaction products comprising water containing traces of formic acid were continuously removed. Dodecyl benzoic acid was recovered from the reaction mixture by neutralizing the mixture with sodium hydroxide, adding between 5% and 10% of isopropyl alcohol, and extracting non-acidic material with petroleum ether. The extracted salt solution was boiled to remove solvents, acidified, and the precipitated acid was separated by decantation. The acid was then distilled with superheated steam and dried in vacuo. Tertiary-dodecyl benzoic acid consisting predominantly of para-tertiary-dodecyl benzoic acid was recovered in a yield of 78.1%, based upon the amount of hydrocarbon consumed. The tertiary-dodecyl benzoic acid had the following characteristics:

| | Found | Calculated for $C_{19}H_{30}O_2$ |
|---|---|---|
| acidity equivalents/100 g | 0.35 (2) | 0.344 |
| carbon, per cent | 77.5 (1) | 78.57 |
| hydrogen, per cent | 9.8 (0) | 10.41 |
| molecular weight | 270±16 | 290.43 |

The sodium salt of the tertiary-dodecyl benzoic acid has been found to give a very lasting foam when an aqueous solution thereof is vigorously agitated.

Para-tertiary-pentadecyl benzoic acid, para-tertiary-hexadecyl benzoic acid, para-tertiary-octadecyl benzoic acid, para-tertiary-heneicosyl benzoic acid and like para-tertiary-alkyl mono-substituted benzoic acids wherein the tertiary-alkyl group contains from 9 to 21 carbon atoms can be prepared similarly by oxidation of para-tertiary-pentadecyl toluene, para-tertiary-hexadecyl toluene, para-tertiary-octadecyl toluene, para-tertiary-heneicosyl toluene and like para-tertiary-alkyl mono-substituted toluenes, respectively, wherein the tertiary-alkyl group contains from 9 to 21 carbon atoms.

*Example VIII*

Para-tertiary-nonyl toluene was prepared by the alkylation of toluene with propylene trimer in the presence of sulfuric acid. The resulting alkylate, having a boiling point of 70° C. to 80° C. at 0.3 to 1.0 millimeter mercury pressure, was treated with a stream of gaseous oxygen for twenty-one hours at 120° C. in the presence of 1% of cobalt isovalerylacetonate, water formed by the reaction being continuously removed. The reaction mixture, when cooled, had the appearance of a binary mixture, although it did not separate into two distinct phases. The reaction product was fractionally distilled. The fraction distilling at 150° C. to 180° C. under about 0.5 millimeter mercury pressure was separated as para-tertiary-nonyl benzoic acid. The product was a very viscous, yellowish material which partially crystallized upon standing. The sodium salt of the nonyl benzoic acid exhibited a detergent action.

*Example IX*

Xylene was alkylated by treatment with propylene tetramer according to the method described in Example I. The resulting dodecyl xylene was oxidized by aeration with a stream of gaseous oxygen at a temperature of 100° C. to 118° C. for forty-eight hours in the presence of 1% by weight of cobalt isovalerylacetonate. Dodecyl toluic acid was obtained as the product.

This application is a continuation-in-part of our copending application, Serial No. 814, filed January 6, 1948, now abandoned.

We claim as our invention:

1. The process for the production of a tertiary-alkyl benzoic acid wherein the tertiary-alkyl group is the only substituent which comprises bringing a stream of molecular oxygen-containing gas and the corresponding tertiary-alkyl toluene wherein the tertiary-alkyl group is the only substituent in liquid phase into intimate contact at a temperature within the range of from 130° C. to about 225° C. under pressure up to about 1000 pounds per square inch in the presence of from about 0.005% to about 5% by weight of a soluble salt of a heavy metal as oxidation catalyst, and recovering said tertiary-alkyl benzoic acid when not over about 70% of the tertiary-alkyl toluene initially in the reaction mixture has been consumed.

2. The process for the production of a tertiary-alkyl benzoic acid wherein the tertiary-alkyl group is the only substituent which comprises bringing a stream of a molecular oxygen-containing gas under pressure up to about 1000 pounds per square inch and the corresponding tertiary-alkyl toluene wherein the tertiary-alkyl group is the only substituent in liquid phase into intimate contact at a temperature within the range of from 140° C. to 200° C. in the presence of from about 0.005% to about 5% by weight of a soluble organic salt of a heavy metal wherein oxygen is directly linked to heavy metal as oxidation catalyst for a reaction time of not over 18 hours, and recovering said tertiary-alkyl benzoic acid.

3. The process for the production of a tertiary-alkyl benzoic acid wherein the tertiary-alkyl group is the only substituent which comprises bringing a stream of a molecular oxygen-containing gas under pressure up to about 1000 pounds per square inch and the corresponding tertiary-alkyl toluene wherein the tertiary-alkyl group is the only substituent in liquid phase into intimate contact at a temperature within the range of from 140° C. to 200° C. in the presence of from about 0.005% to about 5% by weight of a soluble cobalt salt for a reaction time of not over 18 hours, and recovering said tertiary-alkyl benzoic acid.

4. The process for the production of para-tertiary-butylbenzoic acid which comprises bringing a stream of molecular oxygen-containing gas under pressure up to about 1000 pounds per square inch and para-tertiary-butyltoluene in liquid phase into intimate contact at a temperature within the range of from 140° C. to 200° C. in the presence of from about 0.005% to about 5% by weight of a soluble cobalt salt for a reaction time of not over 18 hours, and recovering said para-tertiary-butylbenzoic acid.

5. The process for the production of tertiary-butyl benzoic acid which comprises bringing a stream of molecular oxygen-containing gas under a pressure of from about 100 to about 1000 pounds per square inch and tertiary-butyl toluene in liquid phase into intimate contact at a temperature within the range of from 140° C. to 200° C. in the presence of from about 0.005% to about 5% by weight of a soluble salt of a metal of the group consisting of cobalt and manganese as oxidation catalyst and recovering the tertiary-butyl benzoic acid when not over about 70% of the tertiary-butyl toluene initially in the reaction mixture has been consumed.

6. The process for the production of para-tertiary-butylbenzoic acid which comprises bringing a stream of molecular oxygen-containing gas under a pressure within the range of from about 100 to about 1000 pounds per square inch and para-tertiary-butyltoluene in liquid phase into intimate contact at a temperature within the range of from 140° C. to 200° C. in the presence of from about 0.01% to about 2% by weight of a soluble cobalt salt, terminating the reaction when not over about 70% of the para-tertiary-butyltoluene initially in the reaction mixture has been consumed, and recovering said para-tertiary-butylbenzoic acid.

7. The process for the production of para-tertiary-butylbenzoic acid which comprises bringing a stream of molecular oxygen-containing gas under a pressure of from about 100 to about 1000 pounds per square inch and para-tertiary-butyltoluene in liquid phase into intimate contact at a temperature within the range of from 140° C. to 200° C. in the presence of from about 0.005% to about 5% by weight of cobalt naphthenate, terminating the reaction when not over about 70% of the para-tertiary-butyltoluene initially in the reaction mixture has been consumed, and recovering said para-tertiary-butylbenzoic acid.

GEORGE W. HEARNE.
THEODORE W. EVANS.
VERNON W. BULS.

REFERENCES CITED

The following references are of record in the file of this patent:

UNITED STATES PATENTS

| Number | Name | Date |
|---|---|---|
| 2,195,198 | Balle et al. | Mar. 26, 1940 |
| 2,302,462 | Palmer et al. | Nov. 17, 1942 |
| 2,499,055 | Cosby et al. | Feb. 28, 1950 |